United States Patent
Li

(10) Patent No.: US 11,584,300 B2
(45) Date of Patent: Feb. 21, 2023

(54) REAR-VIEW MIRROR, ANTI-GLARE DISPLAY CONTROL METHOD AND DEVICE OF REAR-VIEW MIRROR AND STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Wenbo Li, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/213,502

(22) Filed: Mar. 26, 2021

(65) Prior Publication Data

US 2021/0309152 A1    Oct. 7, 2021

(30) Foreign Application Priority Data

Apr. 7, 2020 (CN) .......................... 202010265192.4

(51) Int. Cl.
*B60R 1/08* (2006.01)
*G02F 1/1335* (2006.01)
(Continued)

(52) U.S. Cl.
CPC ............ *B60R 1/088* (2013.01); *G02F 1/0136* (2013.01); *G02F 1/1396* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,767,145 B1* | 7/2014 | Zhang | G02F 1/13471 349/96 |
| 2002/0032510 A1* | 3/2002 | Turnbull | H04R 1/08 701/49 |

(Continued)

FOREIGN PATENT DOCUMENTS

| CN | 107264414 A | 10/2017 |
|---|---|---|
| CN | 109283764 A | 1/2019 |

(Continued)

OTHER PUBLICATIONS

China National Intellectual Property Administration, First office action of Chinese application No. 202010265192.4 dated Apr. 1, 2022, which is foreign counterpart application of this US application.

*Primary Examiner* — Hoan C Nguyen
(74) *Attorney, Agent, or Firm* — Fay Sharpe LLP

(57) ABSTRACT

A rear-view mirror includes a body, wherein the body includes a first polarizer, a dimming layer, a transflective polarizer, and a display component which are sequentially laminated. The dimming layer is configured to adjust a polarization direction of light passing through the dimming layer. By adjusting the polarization direction of the light passing through the dimming layer via the dimming layer, the reflectivity and transmittance of the transflective polarizer to the light can be changed, such that both an anti-glare function and a display function of the rear-view mirror can be achieved.

19 Claims, 6 Drawing Sheets

(51) Int. Cl.
*G02F 1/01* (2006.01)
*G02F 1/133* (2006.01)
*G02F 1/1343* (2006.01)
*G02F 1/139* (2006.01)

(52) U.S. Cl.
CPC ...... *G02F 1/13318* (2013.01); *G02F 1/13439* (2013.01); *G02F 1/133514* (2013.01); *G02F 1/133531* (2021.01); *G02F 2203/09* (2013.01)

(56) References Cited

U.S. PATENT DOCUMENTS

| | | | | |
|---|---|---|---|---|
| 2004/0032638 | A1* | 2/2004 | Tonar | G02F 1/1503 359/265 |
| 2006/0132939 | A1* | 6/2006 | Blank | B60R 1/12 359/838 |
| 2008/0198320 | A1* | 8/2008 | Chwu | G02F 1/133305 349/158 |
| 2010/0277786 | A1* | 11/2010 | Anderson | G02B 5/3058 359/247 |
| 2011/0273659 | A1 | 11/2011 | Sobecki | |
| 2014/0340728 | A1* | 11/2014 | Taheri | G02F 1/13475 359/250 |
| 2015/0198834 | A1* | 7/2015 | Wu | G02F 1/13471 349/61 |
| 2019/0162881 | A1* | 5/2019 | Cammenga | B60R 1/088 |
| 2019/0351827 | A1* | 11/2019 | Xue | G02B 5/30 |
| 2020/0018997 | A1* | 1/2020 | Weindorf | B60R 1/12 |

FOREIGN PATENT DOCUMENTS

| | | |
|---|---|---|
| CN | 209486441 U | 10/2019 |
| CN | 210062828 U | 2/2020 |
| CN | 111812876 * | 10/2020 |
| WO | WO-2021000824 A1 * | 1/2021 |

* cited by examiner

REAR-VIEW MIRROR, ANTI-GLARE DISPLAY CONTROL METHOD AND DEVICE OF REAR-VIEW MIRROR AND STORAGE MEDIUM

CROSS-REFERENCE TO RELATED APPLICATIONS

This application is based on and claims priority to Chinese Patent Application No. 202010265192.4, filed on Apr. 7, 2020 and entitled "REAR-VIEW MIRROR AND ANTI-GLARE DISPLAY CONTROL METHOD OF REAR-VIEW MIRROR," the disclosure of which is herein incorporated by reference in its entirety.

TECHNICAL FIELD

The present disclosure relates to the field of display device technologies, and in particular to a rear-view mirror, an anti-glare display control method and device of the rear-view mirror, and a non-transitory storage medium thereof.

BACKGROUND

Rear-view mirrors of a vehicle are important devices for a driver to observe a scene behind the vehicle to ensure driving safety.

With the development of technologies, users have put forward new demands for functions of the rear-view mirrors, that is, requiring a display function. For example, the rear-view mirror is required to be used as a driving recorder and a backup camera.

SUMMARY

Embodiments of the present disclosure provide a rear-view mirror. The rear-view mirror includes: a body, wherein the body includes a first polarizer, a dimming layer, a transflective polarizer, and a display component which are sequentially laminated. The dimming layer is configured to adjust a polarization direction of light passing through the dimming layer.

In some embodiments, the dimming layer is a liquid crystal dimming layer, wherein the liquid crystal dimming layer is configured to adjust the polarization direction of the light passing through the liquid crystal dimming layer based on an applied voltage.

In some embodiments, for the rear-view mirror, the liquid crystal dimming layer includes a first substrate, a first transparent electrode layer, a liquid crystal layer, a second transparent electrode layer, and a second substrate which are sequentially laminated, wherein a side of the first substrate facing away from the first transparent electrode layer is attached to the first polarizer, and a side of the second substrate facing away from the second transparent electrode layer is attached to the transflective polarizer.

In some embodiments, for the rear-view mirror, the first transparent electrode layer includes a first portion and a second portion which are insulated from each other. The first portion of the first transparent electrode layer is electrically connected to the second transparent electrode layer, and the second portion of the first transparent electrode layer is opposite to the second transparent electrode layer.

In some embodiments, the second portion of the first transparent electrode layer is disposed in the middle of the first substrate, and the first portion of the first transparent electrode layer is disposed on an edge of the first substrate and surrounds the second portion of the first transparent electrode layer.

In some embodiments, the first portion of the first transparent electrode layer is provided with a plurality of connection points to the second transparent electrode layer, the plurality of connection points being distributed around the second portion of the first transparent electrode layer.

In some embodiments, the liquid crystal layer is a twisted nematic liquid crystal layer.

In some embodiments, a light transmission axis of the first polarizer and a light transmission axis of the transflective polarizer satisfy one of the following relationships: a parallel relationship; and a perpendicular relationship.

In some embodiments, the rear-view mirror further includes a first light sensor, wherein the first light sensor is disposed on a mirror side of the body and configured to detect a light intensity on the mirror side, the mirror side being a side of the first polarizer facing away from the dimming layer; a second light sensor, wherein the second light sensor is disposed on a back side of the body and configured to detect a light intensity on the back side, the back side being a side of the display component facing away from the transflective polarizer; and a controller, wherein the controller is electrically connected to the first light sensor, the second light sensor and the dimming layer, and configured to control the dimming layer to adjust the polarization direction of the light passing through the dimming layer based on the light intensity on the mirror side and the light intensity on the back side.

In some embodiments, the rear-view mirror further includes a first transparent reinforcement layer, wherein the first transparent reinforcement layer is laminated between the first polarizer and the dimming layer.

In some embodiments, for the rear-view mirror, a surface of the first transparent reinforcement layer attached to the first polarizer is rough.

In some embodiments, the rear-view mirror further includes a second transparent reinforcement layer, wherein the second transparent reinforcement layer is laminated between the dimming layer and the transflective polarizer.

In some embodiments, the body includes the first polarizer, a first substrate, a first transparent electrode layer, a liquid crystal layer, a second transparent electrode layer, a second substrate, the transflective polarizer, a color filter substrate, a liquid crystal pixel layer, an array substrate, a second polarizer and a backlight which are sequentially laminated; and the rear-view mirror further includes a housing, a first light sensor and a second light sensor, wherein the housing is configured to accommodate the body and is provided with a window corresponding to a mirror side of the body, the first light sensor is disposed on the mirror side of the body, the second light sensor is disposed on a back side of the body, the mirror side being a side of the first polarizer facing away from the first substrate, and the back side being a side of the backlight facing away from the transflective polarizer.

In some embodiments, the body further includes a third polarizer, wherein the third polarizer is laminated between the transflective polarizer and the color filter substrate, and a light transmission axis of the third polarizer is parallel to a light transmission axis of the transflective polarizer.

In some embodiments, the rear-view mirror further includes an infrared sensor, wherein the infrared sensor is disposed on a side of the first polarizer facing away from the crystal liquid dimming layer.

Embodiments of the present disclosure further provide an anti-glare display control method of a rear-view mirror, wherein the rear-view mirror includes a body including a first polarizer, a dimming layer, a transflective polarizer, and a display component which are sequentially laminated, wherein the dimming layer is configured to adjust a polarization direction of light passing through the dimming layer. The method includes: detecting the a light intensity on a mirror side of the body and a light intensity on a back side of the body, wherein the mirror side is a side of the first polarizer facing away from the dimming layer, and the back side is a side of the display component facing away from the transflective polarizer; and controlling the dimming layer to adjust the polarization direction of the light passing through the dimming layer based on the light intensity on the mirror side and the light intensity on the back side.

Optionally, the dimming layer is a liquid crystal dimming layer; and controlling the dimming layer to adjust the polarization direction of the light passing through the dimming layer based on the light intensity on the mirror side and the light intensity on the back side includes at least one of: applying a voltage corresponding to a difference to the liquid crystal dimming layer, wherein the difference is a difference between the light intensity on the mirror side and the light intensity on the back side, and applying a voltage corresponding to a ratio to the liquid crystal dimming layer, wherein the ratio is a ratio of the light intensity on the mirror side to the light intensity on the back side.

In some embodiments, the difference and the corresponding voltage satisfy one of the following relationships:

the difference smaller than a threshold corresponds to a first predetermined voltage value, and the difference greater than the threshold corresponds to a second predetermined voltage value, and the first predetermined voltage value and the second predetermined voltage value are different; and different differences correspond to different voltages; and the ratio and the corresponding voltage satisfy one of the following relationships:

the ratio smaller than a predetermined ratio corresponds to a first predetermined voltage value, and the ratio greater than the predetermined ratio corresponds to a second predetermined voltage value, and the first predetermined voltage value and the second predetermined voltage value are different; and different ratios correspond to different voltages.

Embodiments of the present disclosure further provide a control device. The control device includes a memory storing at least one program instruction therein; and at least one processor communicably coupled to the memory; wherein the at least one processor, when executing the at least one program instruction, is caused to perform the anti-glare display control method of the rear-view mirror as described above.

Embodiments of the present disclosure further provide a non-transitory computer-readable storage medium storing a computer program therein, wherein the computer program, when run by a processor, causes the processor to perform the anti-glare display control method of the rear-view mirror as described above.

Reference signs in FIGS. 1 to 8 and denotations thereof:

100—body, 101—mirror side, 102—back side, 103—dimming component, 104—display component, 1—first light sensor, 2—second light sensor, 3—first polarizer, 4—dimming layer, 41—first substrate, 42—second substrate, 43—first transparent electrode layer, 431—first portion of the first transparent electrode layer, 432—second portion of the first transparent electrode layer, 44—second transparent electrode layer, 45—liquid crystal layer, 5—transflective polarizer, 6—color filter substrate, 7—liquid crystal pixel layer, 8—array substrate, 9—second polarizer, 10—backlight, 11—first transparent reinforcement layer, 12—second transparent reinforcement layer, 13—third polarizer, 14—housing, and 141—window.

DETAILED DESCRIPTION

Figure 1:
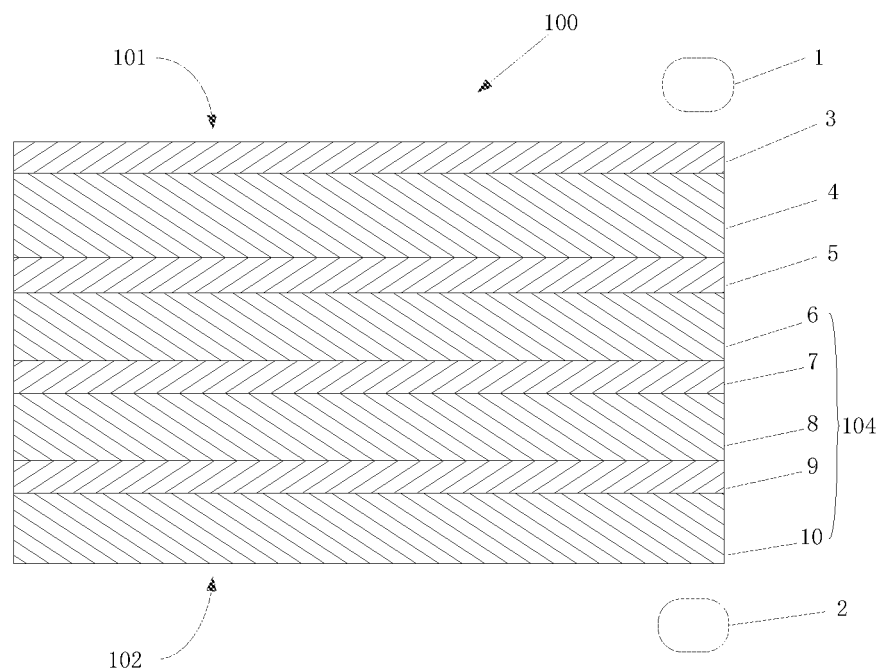
FIG. 1 is a structural diagram of a rear-view mirror according to an embodiment of the present disclosure.

FIG. 1 is a structural diagram of a rear-view mirror according to an embodiment of the present disclosure. As shown in FIG. 1, the rear-view mirror includes a body 100. The body 100 includes a first polarizer 3, a dimming layer 4, a transflective polarizer 5, and a display component 104 which are sequentially laminated. The dimming layer 4 is configured to adjust a polarization direction of light passing through the dimming layer 4.

The transflective polarizer 5 may transmit light whose polarization direction is parallel to a light transmission axis of the transflective polarizer 5 and reflect light whose polarization direction is perpendicular to the light transmission axis of the transflective polarizer 5. The transmittance and reflectivity of the transflective polarizer 5 when polarized light is irradiated to the transflective polarizer 5 depend on an angle between the polarization direction of the polarized light and the light transmission axis of the transflective polarizer 5. The greater the angle is, the lower the transmittance is and the higher the reflectivity is; and the smaller the angle is, the higher the transmittance is, and the lower the reflectivity is.

By adjusting the polarization direction of the light passing through the dimming layer 4 via the dimming layer 4, the angle between the polarization direction of ambient light passing through the dimming layer 4 and the light transmission axis of the transflective polarizer 5 may be changed, such that the reflectivity of the transflective polarizer 5 is changed. Thus, when the transflective polarizer 5 exhibits a relatively lower reflectivity, thereby the light reflected by the rear-view mirror can be reduced and the glare of the rear-view mirror can be avoided.

In some embodiments, the dimming layer 4 is a liquid crystal dimming layer, wherein the liquid crystal dimming layer is configured to adjust the polarization direction of the light passing through the liquid crystal dimming layer based on an applied voltage.

By adjusting the voltage applied to the liquid crystal dimming layer, the arrangement of liquid crystal molecules may be changed, thereby changing the polarization direction of the light. In this way, by adjusting the voltage applied to the liquid crystal dimming layer, the reflectivity and transmittance of the transflective polarizer 5 may be changed when the polarized light is irradiated to the transflective polarizer 5.

By taking the dimming layer 4 being the liquid crystal dimming layer as an example, the ambient light is incident into the body 100 through the first polarizer 3, and then the ambient light is converted into polarized light with a same polarization direction as the first polarizer 3. When the ambient light passes through the dimming layer 4, as the polarization direction of the ambient light may be changed by changing the voltage applied to the dimming layer 4, the polarization direction of the ambient light passing through the dimming layer 4 may form a specific angle with the light transmission axis of the transflective polarizer 5 by applying an appropriate voltage to the dimming layer 4.

For the ambient light passing through the dimming layer 4, part of the ambient light may transmit through the transflective polarizer 5 and the other part of the ambient light is reflected by the transflective polarizer 5, due to the angle between the polarization direction of the ambient light and the light transmission axis of the transflective polarizer 5. The ambient light transmitted through the transflective polarizer 5 is absorbed by the display component 104. When the reflected ambient light passes through the dimming layer 4, its polarization direction is restored to be the same as the polarization direction of the first polarizer 3 and then the reflected ambient passes through the first polarizer 3.

By adjusting the voltage applied to the dimming layer 4, the angle between the polarization direction of the ambient light passing through the dimming layer 4 and the light transmission axis of the transflective polarizer 5 is changed, and the reflectivity and transmittance of transflective polarizer 5 may be changed when the ambient light is irradiated to the transflective polarizer 5. Thus, the reflectivity of the rear-view mirror may be adjusted and the intensity of light reflected by the rear-view mirror may be changed, thereby achieving the purpose of glare prevention.

After passing through the transflective polarizer 5, light emitted from the display component 104 enters the dimming layer 4, and its polarization direction is rotated to form a specific angle with a light transmission axis of the first polarizer 3 under the action of the dimming layer 4. After the light emitted from the display component 104 is transmitted through the transflective polarizer 5, part of the light is absorbed by the first polarizer 3 and the other part of the light passes through the first polarizer 3.

When the voltage applied to the dimming layer 4 is adjusted, after the light emitted from the display component 104 passes through the dimming layer 4, the angle between the polarization direction of the light emitted from the display component 10 and the light transmission axis of the first polarizer 3 is also changed. As such, the intensity of the light transmitting through the first polarizer 3 is changed, thereby adjusting the display brightness of the rear-view mirror. Therefore, by adjusting the voltage applied to the dimming layer 4, the reflectivity and transmittance of the rear-view mirror may be changed, such that both an anti-glare function and a display function of the rear-view mirror can be achieved.

In some embodiments, the light transmission axis of the first polarizer 3 is parallel or perpendicular to the light transmission axis of the transflective polarizer 5.

Figure 2:
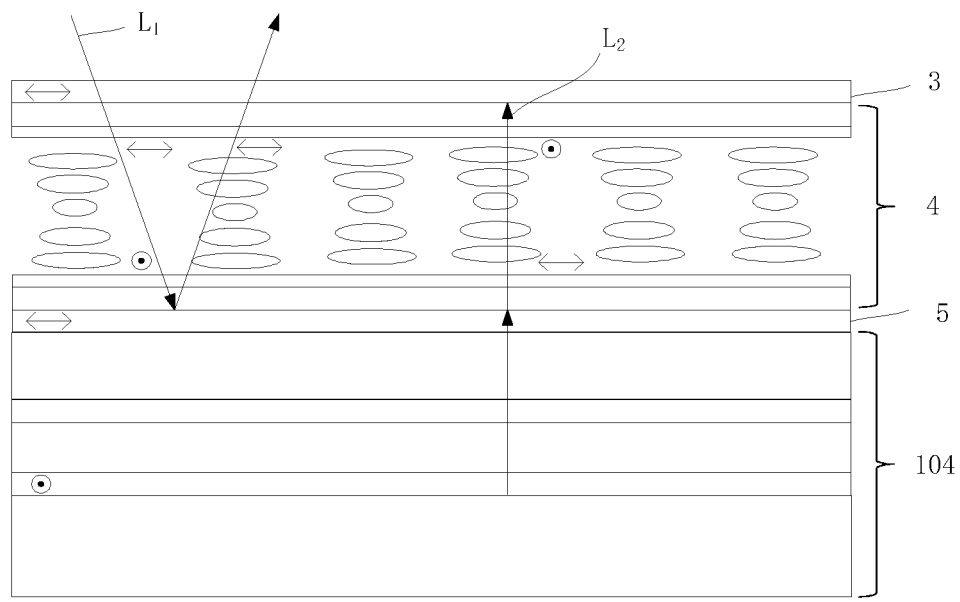
FIG. 2 is a diagram of a light path when the rear-view mirror works according to an embodiment of the present disclosure.

FIG. 2 is a diagram of a light path when the rear-view mirror works according to an embodiment of the present disclosure. As shown in FIG. 2, the light transmission axis of the first polarizer 3 is parallel to the light transmission axis of the transflective polarizer 5. As an example, in FIG. 2, the light transmission axis of the first polarizer 3 and the light transmission axis of the transflective polarizer 5 are parallel to a surface of a sheet of FIG. 2.

By adjusting the voltage applied to the dimming layer 4, the polarization direction of the polarized light is rotated by 90° when the polarized light passing through the dimming layer 4. The ambient light $L_1$ is converted into the polarized light with a polarization direction parallel to the light transmission axis of the first polarizer 3 after transmitting through the first polarizer 3. At this time, the ambient light $L_1$ is P light. After transmitting through the dimming layer 4, the polarization direction of the ambient light is rotated by 90° and is perpendicular to the surface of the sheet of FIG. 2. At this time, the ambient light $L_1$ is converted into S light. As the polarization direction of the ambient light $L_1$ is perpendicular to the light transmission axis of the transflective polarizer 5, the ambient light irradiated to the transflective polarizer 5 is completely reflected.

The ambient light $L_1$ reflected by the transflective polarizer 5 passes through the dimming layer 4 again, and the polarization direction thereof is rotated by 90° with a rotating direction opposite to the rotating direction of the ambient light when the ambient light is passing through the dimming layer 4 from the first polarizer 3. The polarization direction of the ambient light $L_1$ is restored to be parallel to the light transmission axis of the first polarizer 3 and the ambient light $L_1$ is converted into P light. Since the ambient light $L_1$ is transmitted through the first polarizer 3, the intensity of the ambient light $L_1$ reflected by the rear-view mirror reaches a maximum value.

After light $L_2$ emitted from the display component 104 passes through the transflective polarizer 5, a polarization direction of the light $L_2$ is parallel to the light transmission axis of the transflective polarizer 5 and the light $L_2$ is converted into P light. After passing through the dimming layer 4, the polarization direction of the light $L_2$ is rotated by 90° and is perpendicular to the surface of the sheet of FIG. 2 and the light $L_2$ is converted into S light. As the polarization direction is changed to be perpendicular to the light transmission axis of the first polarizer 3, the light $L_2$ emitted from the display component 104 cannot pass through the first polarizer 3. At this time, the reflectance of the rear-view mirror is the largest and the transmittance is the smallest. The rear-view mirror is in a reflective display state, and a brightness of the displayed image is the smallest.

Figure 3:
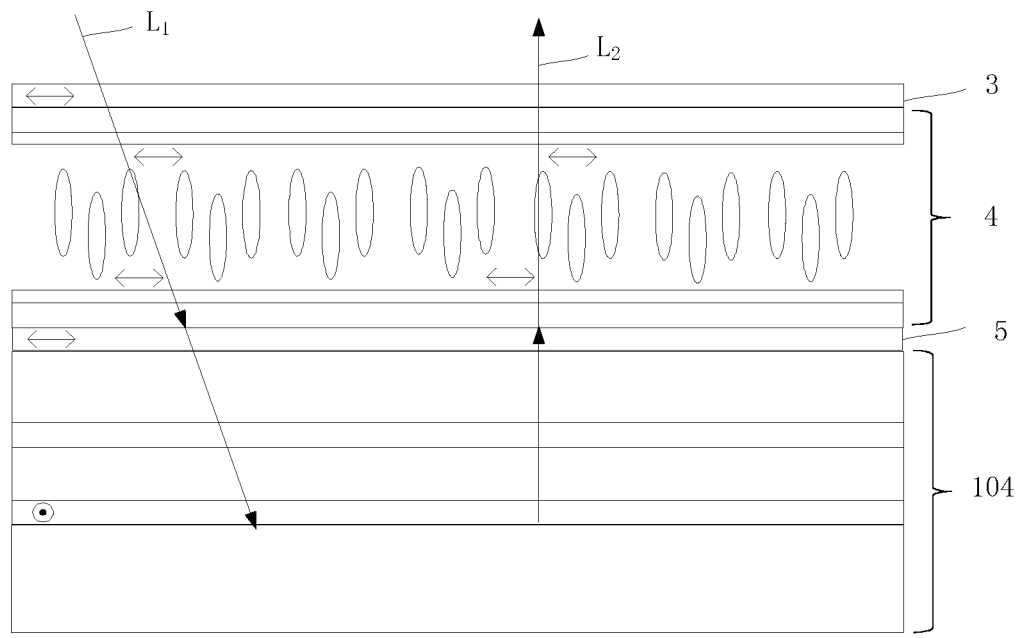
FIG. 3 is a diagram of another light path when the rear-view mirror works according to an embodiment of the present disclosure.

As shown in FIG. 3, by adjusting the voltage applied to the dimming layer 4, the liquid crystal molecules in the dimming layer 4 is twisted, such that the polarization direction of the polarized light is rotated by 0° when the polarized light passes through the dimming layer 4. At this time, after transmitting through the first polarizer 3, the ambient light $L_1$ is converted into a polarized light with a polarization direction parallel to the light transmission axis of the first polarizer 3, and the ambient light $L_1$ is P light. The polarization direction of the ambient light $L_1$ is rotated by 0° after the ambient light $L_1$ is transmitted through the dimming layer 4, the polarization direction of the ambient light $L_1$ is parallel to the light transmission axis of the transflective polarizer 5, and the ambient light $L_1$ is still P light. Therefore, the ambient light $L_1$ irradiated to the transflective polarizer 5 is completely transmitted. The ambient light $L_1$ enters the display component 104 and is absorbed by the display component 104, and the intensity of the ambient light reflected by the rear-view mirror reaches a minimum.

After light $L_2$ emitted from the display component 104 passes through the transflective polarizer 5, the polarization direction of the light $L_2$ is parallel to the light transmission axis of the transflective polarizer 5 and the light $L_2$ is P light. After passing through the dimming layer 4, the polarization direction of the light $L_2$ is rotated by 0° and the light $L_2$ is still P light. The polarization direction of the light $L_2$ is parallel to the light transmission axis of the first polarizer 3, such that the light $L_2$ emitted from the display component 104 all passes through the first polarizer 3. At this time, the reflectance of the rear-view mirror is the smallest and the transmittance is the largest. The rear-view mirror is in an anti-glare display state, and the brightness of the displayed image is the largest.

When the voltage applied to the dimming layer 4 changes, a rotation angle of the polarization direction of the polarized light passing through the dimming layer 4 also changes. Therefore the intensity of the ambient light $L_1$ reflected by the transflective polarizer 5 and the intensity of the ambient light $L_1$ transmitted by the transflective polarizer 5 can be changed, and the intensity of the light $L_2$ absorbed by the first polarizer 3 and the intensity of the light $L_2$ transmitted by the first polarizer 3 can be also changed, wherein the light $L_2$ is emitted by the display component 104, such that the reflectivity and transmittance of the rear-view mirror can be changed, the glare of the rear-view mirror can be prevented, and a good display effect is achieved at the same time.

If the light transmission axis of the first polarizer 3 is perpendicular to the light transmission axis of the transflective polarizer 5, when the voltage applied to the dimming layer 4 makes the polarization direction of the polarized light passing through the dimming layer 4 change by 90°, the intensity of the ambient light reflected by the rear-view mirror reaches the minimum, and the brightness of the image displayed by the rear-view mirror reaches the maximum. When the voltage applied to the dimming layer 4 makes the polarization direction of the polarized light passing through the dimming layer 4 change by 0°, the intensity of the ambient light reflected by the rear-view mirror reaches the maximum, and the brightness of the image displayed by the rear-view mirror reaches the minimum. Likewise, by adjusting the voltage applied to the dimming layer 4, the reflectivity and transmittance of the rear-view mirror may be adjusted, such that the glare of rear-view mirror can be prevented, and a good display effect is achieved.

When the angle between the light transmission axis of the first polarizer 3 and the light transmission axis of the transflective polarizer 5 is any angle, by adjusting the voltage applied to the dimming layer 4, the reflectivity and transmittance of the rear-view mirror may be changed. By adjusting the voltage applied to the dimming layer 4, the reflectivity and transmittance of the rear-view mirror can reach appropriate values, such that the glare of rear-view mirror can be prevented, and a good display effect is achieved.

As shown in FIG. 1, the body 100 has a mirror side 101 and a back side 102. The mirror side 101 is a side of the first polarizer 3 facing away from the dimming layer 4, and the back side 102 is a side of the display component 104 facing away from the transflective polarizer 5.

The rear-view mirror further includes a first light sensor 1, a second light sensor 2 and a controller (not shown in the figure). The first light sensor 1 is disposed on the mirror side 101 of the body 100 and configured to detect a light intensity on the mirror side 101. The second light sensor 2 is disposed on the back side 102 of the body 100 and configured to detect a light intensity on the back side 102. The controller is electrically connected to the first light sensor 1, the second light sensor 2 and the dimming layer 4, and configured to control the dimming layer 4 to adjust the polarization direction of the light passing through the dimming layer 4 based on the light intensity on the mirror side 101 and the light intensity on the back side 102.

The light intensity on the mirror side 101 and the light intensity on the back side 102 affect visual sense of human eyes when viewing the rear-view mirror. Generally, when the light intensity on the mirror side 101 is relatively high and the light intensity on the back side 102 is relatively low, the glare of the rear-view mirror appears and the display effect of the rear-view mirror is also poor. Based on the light intensity on the mirror side 101 and the light intensity on the back side 102 detected by the first light sensor 1 and the second light sensor 2, the controller may control the polarization direction of the light passing through the dimming layer 4, thereby avoiding the glare of the rear-view mirror and meanwhile improving the display effect of the rear-view mirror.

In some embodiments, when the dimming layer 4 is a liquid crystal dimming layer, the controller is configured to control the voltage applied to the dimming layer 4. The controller is configured to adjust the voltage applied to the dimming layer 4 based on one of a difference between the light intensity on the mirror side 101 and the light intensity on the back side 102 and a ratio of the light intensity on the mirror side 101 to the light intensity on the back side 102.

A light intensity relationship between the mirror side 101 and the back side 102 may be determined accurately based on the difference or the ratio, thereby facilitating adjusting the voltage applied to the dimming layer 4. The controller controls, based on the difference or the ratio, the voltage applied to the dimming layer 4 corresponding to the difference or the ratio, such that the reflectivity and transmittance of the rear-view mirror are appropriate. Thus, a good display effect is achieved while glare is avoided.

In some embodiments, the first light sensor 1 detects the light intensity on the mirror side 101 and sends a first light intensity signal to the controller. The first light intensity signal is configured to indicate the light intensity on the mirror side 101. The second light sensor 2 detects the light intensity on the back side 102 and sends a second light intensity signal to the controller. The second light intensity signal is configured to indicate the light intensity on the back side 102. The controller controls the voltage applied to the dimming layer 4 based on the first light intensity signal and the second light intensity signal.

When the difference between the light intensity indicated by the first light intensity signal and the light intensity indicated by the second light intensity signal is less than a threshold, the controller controls the voltage applied to the dimming layer 4 to be a first predetermined voltage value. When the difference between the light intensity indicated by the first light intensity signal and the light intensity indicated by the second light intensity signal is greater than the threshold, the controller controls the voltage applied to the dimming layer 4 to be a second predetermined voltage value. The reflectivity of the rear-view mirror to the ambient light when the voltage applied to the dimming layer 4 is the second predetermined voltage value is less than the reflectivity of the rear-view mirror to the ambient light when the voltage applied to the dimming layer 4 is the first predetermined voltage value. That is, when the difference between the light intensities on the mirror side 101 and the back side 102 is less than the threshold, the voltage corresponding to this difference is the first predetermined voltage value; and when the difference between the light intensities on the mirror side 101 and the back side 102 is greater than the threshold, the voltage corresponding to this difference is the second predetermined voltage value.

In one example, when the voltage applied to the dimming layer 4 is 0 V, the polarization direction of the light which is transmitted through the first polarizer 3 and reaches the transflective polarizer 5 is perpendicular to the light transmission axis of the transflective polarizer 5. When the voltage applied to the dimming layer 4 is 5 V, the polarization direction of the light which is transmitted through the first polarizer 3 and reaches the transflective polarizer 5 is parallel to the light transmission axis of the transflective polarizer 5. The first predetermined voltage value is 0 V, such that when the difference between the light intensity on the mirror side 101 and the light intensity on the back side 102 is less than the threshold, the rear-view mirror is always in a state in which the reflectivity is maximum. The second predetermined voltage value is 5 V, such that when the difference between the light intensity on the mirror side 101 and the light intensity on the back side 102 is greater than the threshold, the rear-view mirror is always in a state in which the reflectivity is minimum.

In another example, for the difference between the light intensities on the mirror side 101 and the back side 102, different differences correspond to different voltages. An external environment of a vehicle usually changes constantly, and the difference between the light intensities on the mirror side 101 and the back side 102 also changes constantly. Since different differences correspond to different voltages, the reflectivity and the transmittance of the rear-view mirror may change based on the environment so as to better adapt to the environment, thereby avoiding glare and meanwhile achieving a good display effect.

Adjustment on the voltage applied to the dimming layer 4 based on the ratio is similar to adjustment on the voltage applied to the dimming layer 4 based on the difference. When the voltage applied to the dimming layer 4 is adjusted based on the ratio of the light intensity on the mirror side 101 to the light intensity on the back side 102, if the ratio is less than a predetermined ratio, the controller controls the voltage applied to the dimming layer 4 to be the first predetermined voltage value; and if the ratio is greater than the predetermined ratio, the controller controls the voltage applied to the dimming layer 4 to be the second predetermined voltage value. Optionally, different ratios correspond to different voltages, such that the reflectivity and the transmittance of the rear-view mirror may be changed based on the environment so as to better adapt to the environment.

Figure 4:
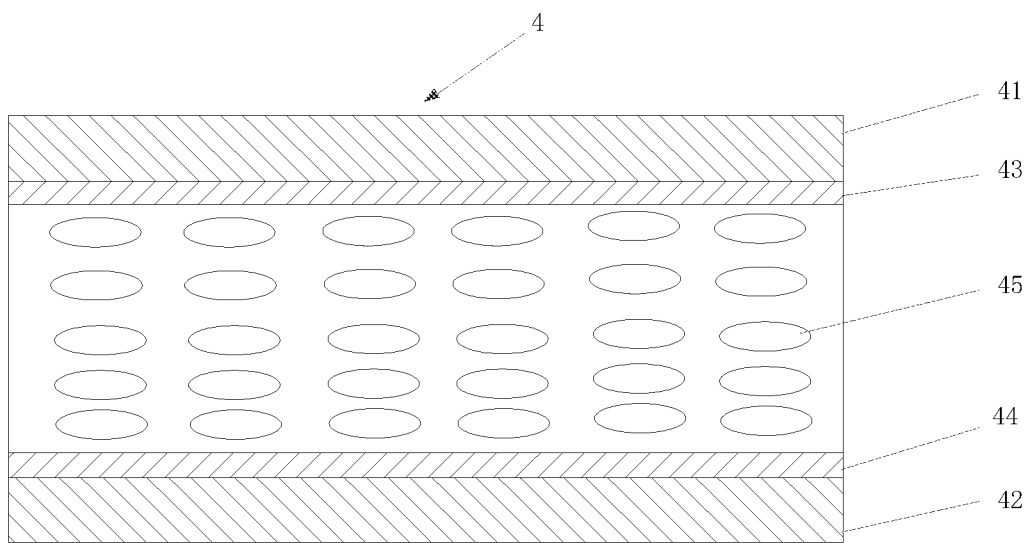
FIG. 4 is a structural diagram of a liquid crystal dimming layer according to an embodiment of the present disclosure.

FIG. 4 is a structural diagram of a liquid crystal dimming layer according to an embodiment of the present disclosure. As shown in FIG. 4, the dimming layer 4 includes a first substrate 41, a first transparent electrode layer 43, a liquid crystal layer 45, a second transparent electrode layer 44 and a second substrate 42 which are sequentially laminated. The side of the first substrate 41 facing the first transparent electrode layer 43 and the side of the second substrate 42 facing the second transparent electrode layer 44 are combined face to face to form a box for accommodating the liquid crystal layer 45. Liquid crystals are filled into the foregoing box to form the liquid crystal layer 45, and preferably form a twisted nematic liquid crystal layer. The first substrate 41 and the second substrate 42 may be transparent substrates, such as glass substrates.

In some examples, both the first transparent electrode layer 43 and the second transparent electrode layer 44 are surface electrodes. The controller is connected to both the first transparent electrode layer 43 and the second transparent electrode layer 44 so as to apply a voltage to the liquid crystal layer 45.

Figure 5:
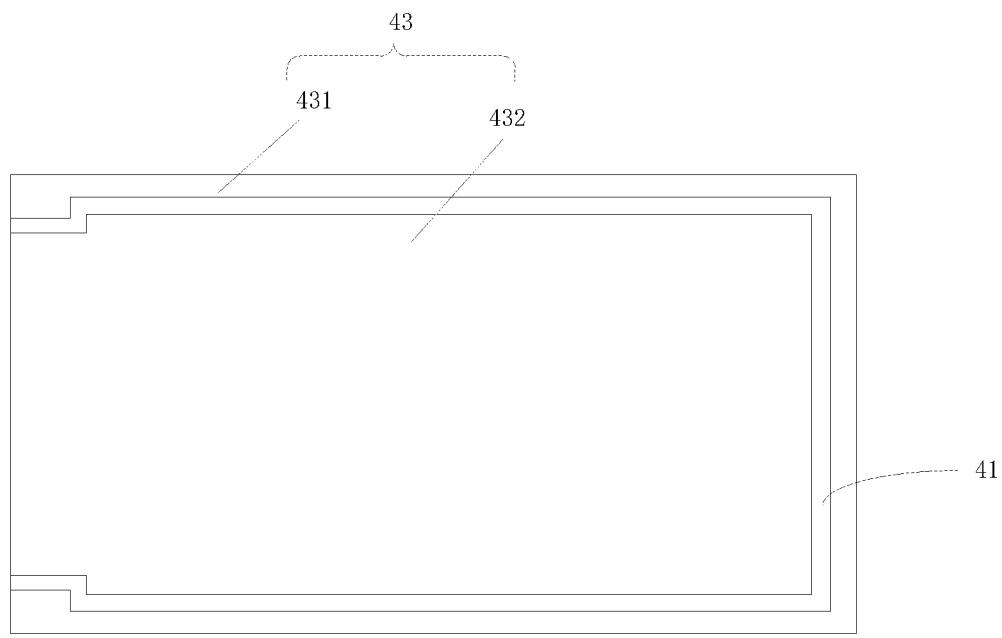
FIG. 5 is a structural diagram of a first transparent electrode layer according to an embodiment of the present disclosure.

FIG. 5 is a structural diagram of a first transparent electrode layer according to an embodiment of the present disclosure. As shown in FIG. 5, in some other examples, the first transparent electrode layer 43 includes a first portion 431 and a second portion 432 which are insulated from each other. The first portion 431 of the first transparent electrode layer 43 is electrically connected to the second transparent electrode layer 44, and the second portion 432 of the first transparent electrode layer 43 is opposite to the second transparent electrode layer 44.

Based on the above structural arrangement, the first portion 431 of the first transparent electrode layer may be electrically connected to the second transparent electrode layer 44, and then the first portion 431 and the second portion 432 are electrically connected to the controller. In this way, a connecting line (such as a flexible cable) between the controller and the first transparent electrode layer 43 and a connecting line between the controller and the second transparent electrode layer 44 may be disposed on the same layer as the first transparent electrode layer 43. Thus, the wiring difficulty is reduced when connecting the first transparent electrode layer and the second transparent electrode layer which are on different layers to the controller, thereby facilitating electrical connection of the above transparent electrode layers and the controller.

As shown in FIG. 5, the second portion 432 of the first transparent electrode layer 43 is disposed in the middle of the first substrate 41, and the first portion 431 of the first transparent electrode layer 43 is disposed on an edge of the first substrate 41 and surrounds the second portion 432. Therefore, the second portion 432 of the first transparent electrode layer 43 occupies most of a region of the first substrate 41, is opposite to the second transparent electrode layer 44, and forms an electric field after being applied a voltage to control the liquid crystal layer 45.

The first portion 431 of the first transparent electrode layer 43 is provided with a plurality of connection points to the second transparent electrode layer 44, the plurality of connection points being distributed around the second portion 432 of the first transparent electrode layer 43. Thus, the problem of uneven distribution of electric fields caused by the relatively larger size of the first transparent electrode layer 43 and the second transparent electrode layer 44 is avoided, and the situation that electric fields formed at different positions between the second portion 432 of the first transparent electrode layer 43 and the second transparent electrode layer 44 are different is avoided.

In some embodiments, the first portion 431 and the second portion 432 of the first transparent electrode layer 43 are formed by etching the transparent electrode layer 43. A manufacturing process of the above dimming layer 4 is known to skilled persons, which is not described herein any further.

An appropriate material and thickness of the transflective polarizer 5 may be selected according to the needs of design and use.

Figure 6:
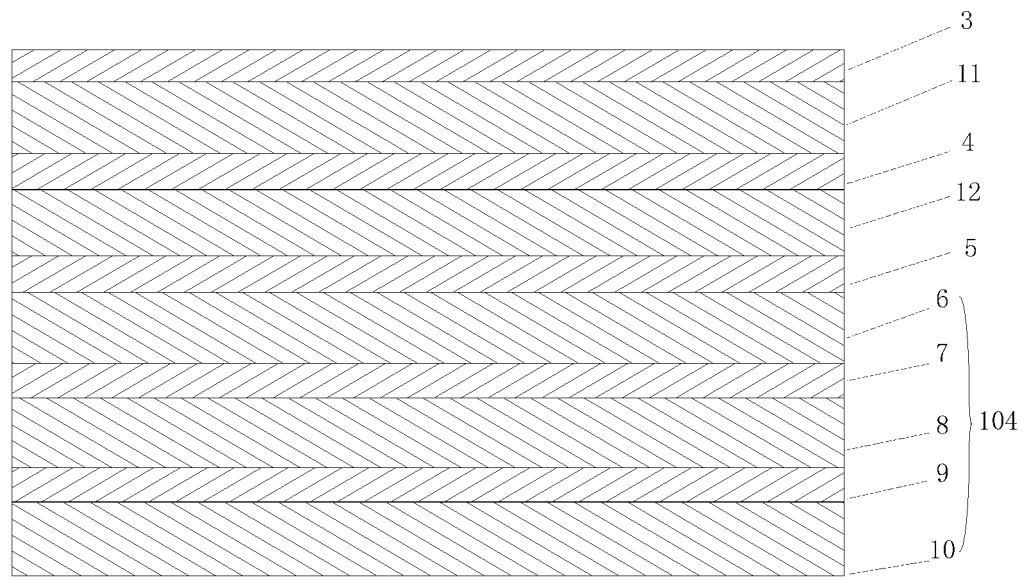
FIG. 6 is a structural diagram of another rear-view mirror according to an embodiment of the present disclosure.

FIG. 6 is a structural diagram of another rear-view mirror according to an embodiment of the present disclosure. As shown in FIG. 6, the body 100 further includes a first transparent reinforcement layer 11 and a second transparent reinforcement layer 12, wherein the first transparent reinforcement layer 11 is laminated between the first polarizer 3 and the dimming layer 4, and the second transparent reinforcement layer 12 is laminated between the dimming layer 4 and the transflective polarizer 5.

The body 100 may be provided with the first transparent reinforcement layer 11 and the second transparent reinforcement layer 12 at the same time, or only be provided with the first transparent reinforcement layer 11 or the second transparent reinforcement layer 12. Both the first transparent reinforcement layer 11 and the second transparent reinforcement layer 12 may increase the overall strength of the body 100, and the first transparent reinforcement layer 11 may be used as a mirror surface of a reflecting mirror. Exemplarily, both the first transparent reinforcement layer 11 and the second transparent reinforcement layer 12 are transparent glass.

In the body 100 not provided with the first transparent reinforcement layer 11 and/or the second transparent reinforcement layer 12, for ensuring the strength of the mirror side 101 of the body 100, the thickness of the first substrate and the second substrate of the dimming layer 4 is greater than (such as 1.5 times of) the thickness of the first substrate 41 or the second substrate 42 in the body 100 provided with the first transparent reinforcement layer 11 or the second transparent reinforcement layer 12.

Further, a surface of the first transparent reinforcement layer 11 attached to the first polarizer 3 is rough. The surface being rough means that the surface of the first transparent reinforcement layer 11 has a predetermined roughness by surface roughening to reduce the reflectivity of the first transparent reinforcement layer 11. For example, the reflectivity of the first transparent reinforcement layer 11 is reduced by 5%-8% by surface roughening.

The roughness may be set according to the properties of the first transparent reinforcement layer 11 itself as long as it is ensured that the reflectivity of the roughened first transparent reinforcement layer 11 can be reduced by 5% to 8%. A specific roughening method is not limited in the present disclosure.

In some embodiments, the display component 104 is a liquid crystal display component. The display component 104 includes a color filter substrate 6, a liquid crystal pixel layer 7, an array substrate 8, a second polarizer 9 and a backlight 10 which are sequentially laminated. The liquid crystal pixel layer 7, the array substrate 8, and the backlight 10 are connected to the controller for display control. Optionally, a control component may be disposed separately, and the display is controlled through the separate control component. When the reflectivity of the rear-view mirror is maximum, the display component 104 is controlled not to display to save power.

Figure 7:
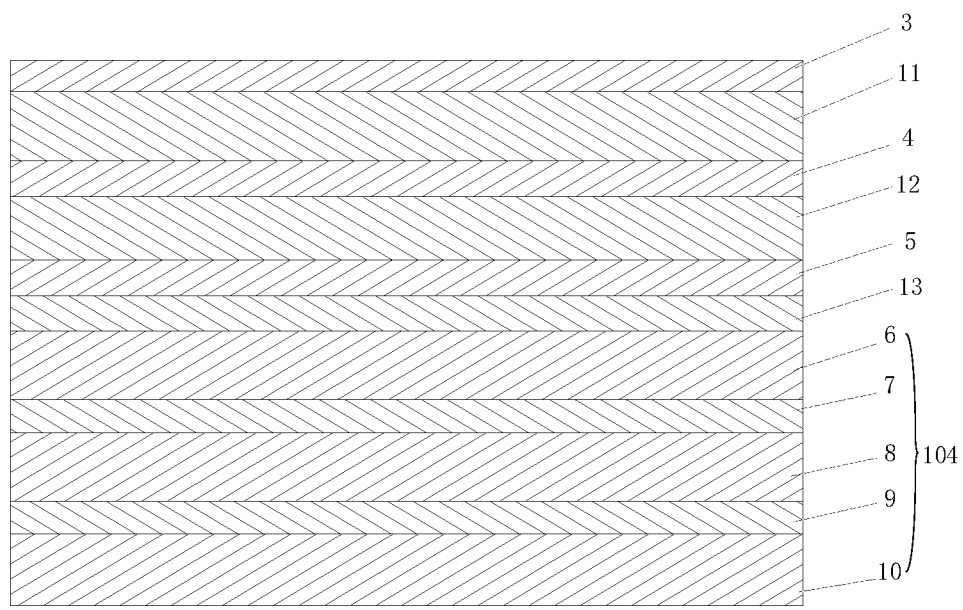
FIG. 7 is a structural diagram of a still another rear-view mirror according to an embodiment of the present disclosure.

FIG. 7 is a structural diagram of a rear-view mirror according to an embodiment of the present disclosure. As shown in FIG. 7, the body 100 further includes a third polarizer 13. The third polarizer 13 is laminated between the transflective polarizer 5 and the color filter substrate 6, and a light transmission axis of the third polarizer is parallel to the light transmission axis of the transflective polarizer 5.

In some examples, the light transmission axis of the third polarizer 13 is perpendicular to a light transmission axis of the second polarizer 9.

In some embodiments, the first polarizer 3, the transflective polarizer 5, the second polarizer 9, and the third polarizer 13 are linear polarizers.

In some embodiments, the rear-view mirror further includes an infrared sensor, wherein the infrared sensor is disposed on a side of the first polarizer 3 facing away from the dimming layer 4, i.e., the mirror side 101 of the body 100. Infrared rays from a person in the vehicle may be detected by the infrared sensor. The infrared sensor is connected to the controller and configured to detect whether a person is sitting the rear seat of the vehicle so as to meet needs of users for a person detection function of the rear-view mirror.

Figure 8:
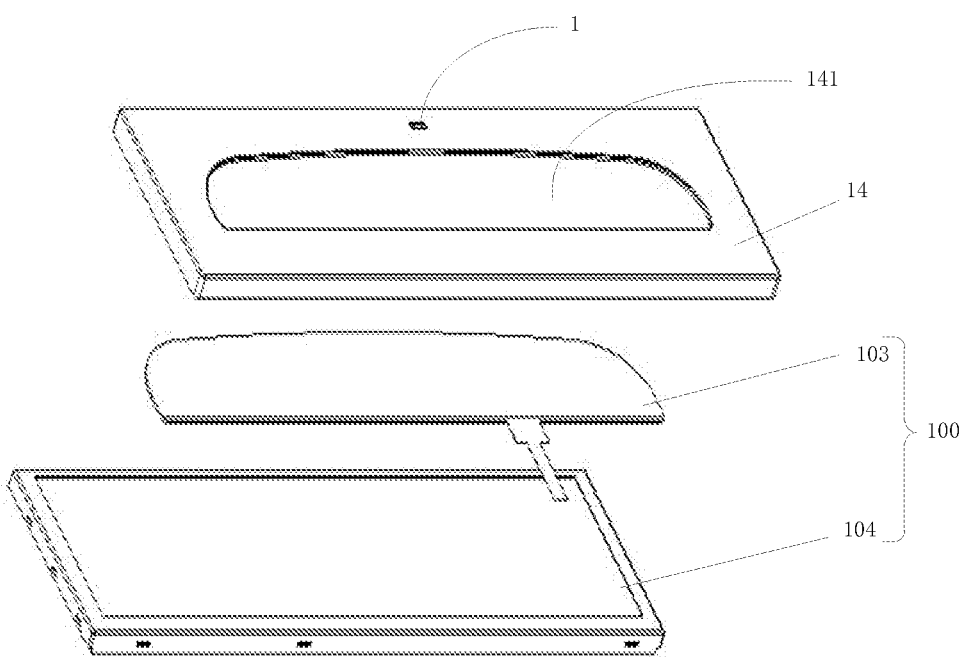
FIG. 8 is an exploded structural diagram of a rear-view mirror according to an embodiment of the present disclosure.

FIG. 8 is an exploded structural diagram of a rear-view mirror according to an embodiment of the present disclosure. As shown in FIG. 8, the body 100 includes a dimming component 103 and a display component 104. The dimming component 103 includes the first polarizer 3, the dimming layer 4 and the transflective polarizer 5. The display component 104 includes the color filter substrate 6, the liquid crystal pixel layer 7, the array substrate 8, the second polarizer 9, and the backlight 10 which are sequentially laminated. The rear-view further includes a housing 14. The housing 14 is configured to accommodate the dimming component 103 and the display component 104. The housing 14 is provided with a window 141 corresponding to the mirror side 101 of the body 100, and thus forms a shape and a structure of the rear-view mirror suitable for the vehicle. The housing 14 is further configured to accommodate the first light sensor 1. The first light sensor 1 is disposed on the mirror side 101 of the body 100 and the second light sensor 2 is disposed on the back side 102 of the body 100. The mirror side 101 of the body 100 corresponds to a front side when the rear-view mirror operates normally, and the back side 102 is a side of the display component 104 facing away from the transflective polarizer 5, i.e., a side of the backlight 10 facing away from the transflective polarizer 5. The first light sensor 1 and the second light sensor 2 are conventional sensors for detecting light intensities and are known to and purchasable by skilled persons.

Figure 9:
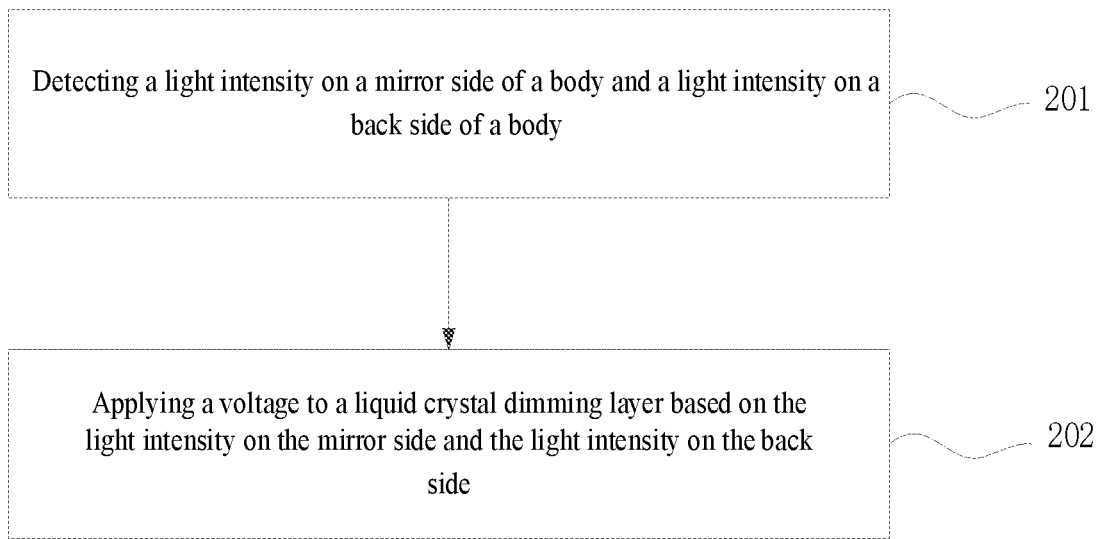
FIG. 9 is a flowchart of an anti-glare display control method of a rear-view mirror according to an embodiment of the present disclosure.

An embodiment of the present disclosure provides an anti-glare display control method of a rear-view mirror. The method is applicable to the rear-view mirror according to the above embodiment. For the structure of the rear-view mirror, reference may be made to related contents described in the above embodiment and is not repeatedly described herein. FIG. 9 is a flowchart of an anti-glare display control method of a rear-view mirror according to an embodiment of the present disclosure. As shown in FIG. 9, the method includes the following processes.

In process 201, a light intensity on a mirror side of the body and a light intensity on a back side of the body are detected.

The mirror side is a side of a first polarizer facing away from a dimming layer, and the back side is a side of a liquid crystal display component facing away from a transflective polarizer.

The light intensity on the mirror side is detected by a first light sensor disposed on the mirror side of the body, and light on the mirror side is usually light from the rear of a vehicle. The light intensity on the back side is detected by a second light sensor disposed on the back side of the body and the light on the back side is usually light from the front of the vehicle.

In process 202, the dimming layer is controlled to adjust a polarization direction of light passing through the dimming layer based on the light intensity on the mirror side and the light intensity on the back side.

Based on the light intensities on the mirror side and the back side, whether there is strong light behind the vehicle may be determined, so as to determine whether the glare of the rear-view mirror appears. Thus, it is convenient for the controller to adjust the polarization direction of the light passing through the dimming layer and adjust a working state of the rear-view mirror, for example, to reduce the reflectivity of the rear-view mirror, thereby avoiding glare.

In some examples, the dimming layer is a liquid crystal dimming layer, and a voltage corresponding to a difference is applied to the liquid crystal dimming layer, wherein the difference is a difference between the light intensity on the mirror side and the light intensity on the back side. After the light intensity on the mirror side and the light intensity on the back side are detected, whether the glare of the rear-view mirror appears may be known based on the difference. The larger the difference is, the greater the degree of glare is. By applying the voltage corresponding to the difference to the liquid crystal dimming layer, glare may be avoided.

In some examples, the difference less than a threshold corresponds to a first predetermined voltage value, and the difference greater than the threshold corresponds to a second predetermined voltage value. When the difference is less than the threshold, the controller controls the voltage applied to the dimming layer to be the first predetermined voltage value. When the difference is greater than the threshold, the controller controls the voltage applied to the dimming layer to be the second predetermined voltage value.

The threshold of the difference between the light intensity on the mirror side and the light intensity on the back side is determined by the reflected light intensity that a user can bear, the ambient light intensity and the like, and the threshold may be specifically set according to actual data acquired in an experiment. The embodiments of the present disclosure provide an implementation method, but do not limit the specific data. When the difference of the light intensities is greater than the threshold, the reflected light generated at this time may make the user feel glare, and thus, at this time the voltage applied by the controller to the liquid crystal dimming layer is the second predetermined voltage value. Therefore, the transmittance of the rear-view mirror body is increased and the reflectivity of the rear-view mirror body is decreased. At this time, an image displayed by a liquid crystal display component of the rear-view mirror may be displayed on the mirror side, and therefore both an anti-glare function and a display function of the rear-view mirror can be achieved.

In some other examples, different differences correspond to different voltages.

Figure 10:
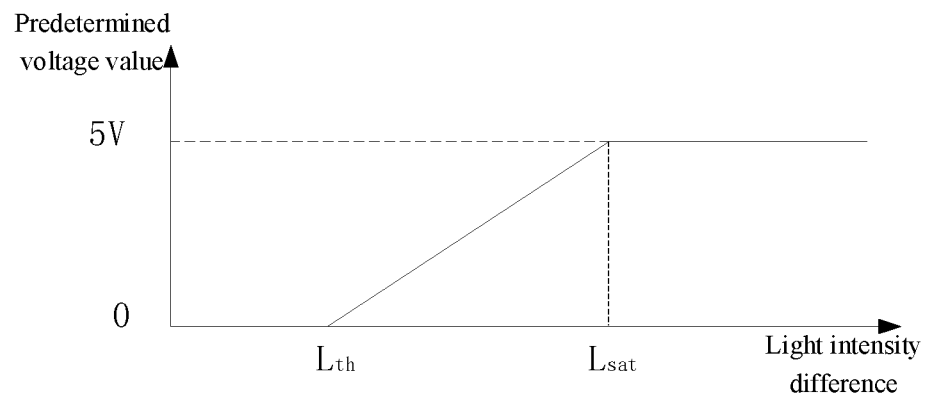
FIG. 10 is a graph of a voltage applied to a liquid crystal dimming layer with a change of a difference of light intensities according to an embodiment of the present disclosure.

In the embodiment of the present disclosure, in an example, the reflectivity of the rear-view mirror reaches the maximum when the voltage applied to the liquid crystal dimming layer is minimum, and the reflectivity of the rear-view mirror reaches the minimum when the voltage applied to the liquid crystal dimming layer is maximum. As shown in FIG. 10, when the difference between the light intensities on the mirror side and the back side of the body is between the threshold $L_{th}$ and a saturated light intensity difference $L_{sat}$, as the difference increases, the voltage applied to the liquid crystal dimming layer correspondingly increases. When the difference is lower than $L_{th}$, the glare of the rear-view mirror does not appear, and there is no need to adjust the voltage applied to the liquid crystal dimming layer. When the difference reaches $L_{sat}$, a strong glare of the rear-view mirror appears. At this time, the reflectivity of the rear-view mirror needs to be adjusted to the minimum to reduce glare, and the voltage applied to the liquid crystal dimming layer needs to be adjusted to the maximum.

If the maximum voltage which may be applied to the liquid crystal dimming layer is 5 V, after the voltage of 5 V is applied to the liquid crystal dimming layer, liquid crystal particles in the liquid crystal dimming layer are arranged completely in a direction of the electric field. At this time, the transmittance of the rear-view mirror reaches the limit. Therefore, when the voltage of 5 V is applied to the liquid crystal dimming layer, the light intensity difference under the condition that the rear-view mirror is kept at a good anti-glare display state, that is, when no glare is generated, is regarded as the saturated light intensity difference. Further, if the light intensity difference is greater than the saturated light intensity difference, the voltage applied by the controller to the liquid crystal dimming layer is constant, i.e., 5 V.

If the difference between the light intensities on the mirror side and the back side of the body is greater than the threshold $L_{th}$, but smaller than the saturated light intensity difference $L_{sat}$, as the difference increases, the voltage applied to the liquid crystal dimming layer gradually increases; and when the difference is greater than the saturated light intensity difference $L_{sat}$, the voltage applied to the liquid crystal dimming layer reaches the maximum. $L_{th}$ and $L_{sat}$ are determined by the reflected light intensity that the user can bear, the ambient light intensity and the like, and may be specifically set based on actual data acquired in an experiment.

The greater the difference between the light intensities on the mirror side and the back side is, the greater the reflected light intensity on the mirror side is. Therefore, since the difference between the light intensities is greater than the threshold, as the difference increases, the voltage applied to the liquid crystal dimming layer needs to be increased correspondingly. As such, the reflectivity of the body of the rear-view mirror is decreased and the transmittance of the body of the rear-view mirror is increased, thereby preventing the glare of the rear-view mirror and achieving a good display effect for the rear-view mirror. The ratio of a change of the light intensity difference to a change of the voltage applied to the liquid crystal dimming layer is a linear ratio. Specific linear parameters may be set in combination with actual experimental data. The experimental data may be different according to different boundary conditions of the experiment. Therefore, the present disclosure provides an implementation method, but does not limit specific data.

Figure 11:
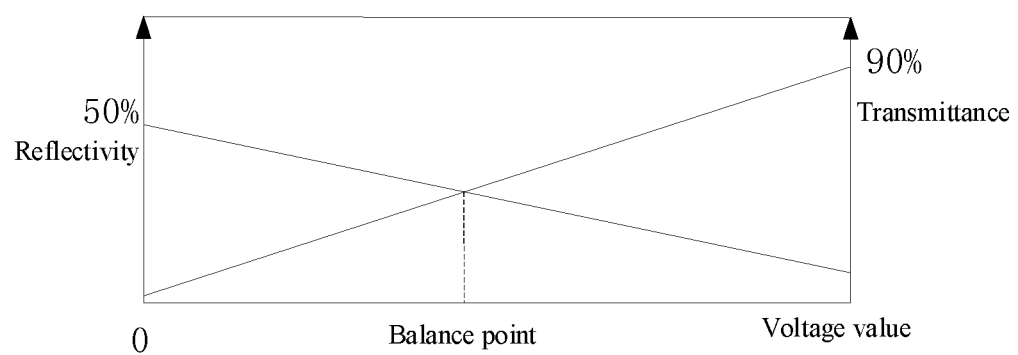
FIG. 11 is a fitting graph of a corresponding curve of light transmittance and a voltage applied to a liquid crystal dimming layer of a rear-view mirror, and a corresponding curve of light reflectivity and the voltage applied to the liquid crystal dimming layer of the rear-view mirror according to an embodiment of the present disclosure.

As shown in FIG. 11, an intersection of two curves is acquired by fitting a corresponding curve of the light transmittance of the rear-view mirror and the voltage applied to the liquid crystal dimming layer, and a corresponding curve of the light reflectivity of the rear-view mirror and the voltage applied to the liquid crystal dimming layer. The intersection is a balance point between the light-reflective display and the perspective display of the rear-view mirror. A voltage value corresponding to the intersection is a voltage value applied to the liquid crystal dimming layer in a normal state, wherein the normal state refers to a state when the vehicle is activated.

The balance point may be acquired through several experiments. A specific experimental method is mastered by the skilled person and is not specifically limited in the present disclosure. The way to acquire the voltage value at the balance point is also not specifically limited, and the voltage value at the balance point can be set according to actual experimental results. The voltage value applied to the liquid crystal dimming layer at the balance point can be acquired just by performing the method of the embodiment of the present disclosure.

In some examples, a voltage corresponding to a ratio is applied to the liquid crystal dimming layer based on the ratio of the light intensity on the mirror side to the light intensity on the back side. Since the light intensity on the mirror side and the light intensity on the back side are detected, whether the glare of the rear-view mirror appears may be determined based on the ratio. The greater the ratio is, the greater the degree of glare is. By applying the voltage corresponding to the ratio to the liquid crystal dimming layer, glare may be avoided.

In some examples, the ratio smaller than a predetermined ratio corresponds to a first predetermined voltage value, the ratio greater than the predetermined ratio corresponds to a second predetermined voltage value, and the first predetermined voltage value and the second predetermined voltage value are different. When the ratio is less than the predetermined ratio, the controller controls the voltage applied to the liquid crystal dimming layer to be the first predetermined voltage value. When the ratio is greater than the predetermined ratio, the controller controls the voltage applied to the liquid crystal dimming layer to be the second predetermined voltage value.

The predetermined ratio is determined by the reflected light intensity that the user can bear, the ambient light intensity and the like, and may be specifically set according to actual data acquired in an experiment. The embodiment of the present disclosure provides an implementation method, but does not limit specific data. When the ratio of the light intensities is greater than the predetermined ratio, the reflected light generated at this time may make the user feel glare. Therefore, the voltage applied by the controller to the liquid crystal dimming layer at this time is the second predetermined voltage value, the transmittance of the body of the rear-view mirror is increased and the reflectivity of the body of the rear-view mirror is decreased. An image displayed by the liquid crystal display component of the rear-view mirror may be displayed on the mirror side, and thus the anti-glare function and the display function of the rear-view mirror are achieved at the same time.

In some other examples, different ratios correspond to different voltages.

In the embodiment of the present disclosure, in an example, the reflectivity of the rear-view mirror reaches the maximum when the voltage applied to the liquid crystal dimming layer is minimum, and the reflectivity of the rear-view mirror reaches the minimum when the voltage applied to the liquid crystal dimming layer is maximum. The greater the ratio is, the stronger the light behind the vehicle is, and the higher the voltage applied to the liquid crystal dimming layer is, and thus the smaller the reflectivity of the rear-view mirror is and the greater the transmittance of the rear-view mirror is. Thus, the glare of the rear-view mirror is prevented and a good display effect for the rear-view mirror is achieved.

An embodiment of the present disclosure further provides a control device. The control device includes a memory storing at least one program instruction therein and at least one processor communicably coupled to the memory. The at least one processor, when executing the at least one program instruction, is caused to perform the anti-glare display control method of the rear-view mirror according to the above embodiment The control device is a device for controlling the rear-view mirror to perform anti-glare display and may be independent of the rear-view mirror. For example, the control device is an integrated control device of a vehicle, and is configured to directly control a controller in the rear-view mirror, and thus control the rear-view mirror to perform light-reflective display or anti-glare display. Optionally, the control device and the controller are the same device, which is disposed in the rear-view mirror and is configured to control the rear-view mirror to perform light-reflective display or anti-glare display.

The at least one processor in the above embodiment implements the corresponding function by executing the at least one program instruction corresponding to the anti-glare display control method of the rear-view mirror, wherein the at least one program instruction is stored in the memory. The at least one processor includes at least one core and a corresponding program unit is called from the memory by the at least one core. The at least one core may be disposed and a control signal is sent by adjusting core parameters. The above memory may include a non-persistent memory, a random-access memory (RAM), and/or a non-volatile memory, such as a read-only memory (ROM) or a flash memory in a computer-readable medium. The memory includes at least one memory chip.

An embodiment of the present disclosure further provides a non-transitory storage medium. The non-transitory storage medium stores a computer program therein. When running the computer program, the computing device in which the non-transitory storage medium is stalled is caused to perform the above anti-glare display control method of the rear-view mirror.

The non-transitory storage medium is a computer program product, which, when executed on a computer device, causes the computer device performing the anti-glare display control method of the rear-view mirror above.

Described above are merely embodiments of the present disclosure, which are not intended to limit the present disclosure in any form. Any simple amendment, equivalent change, and modification of the above embodiments according to the technical essence of the present disclosure still fall within the scope of the technical solutions of the present disclosure.

What is claimed is:

1. A rear-view mirror, comprising:
   a body, wherein the body comprises a first polarizer, a liquid crystal dimming layer, a transflective polarizer, and a display component which are sequentially laminated;
   a controller, wherein the controller is electrically connected to the liquid crystal dimming layer, and configured to apply a voltage corresponding to a difference to the liquid crystal dimming layer, wherein the difference is a difference between a light intensity on a mirror side and a light intensity on a back side, and/or apply a voltage corresponding to a ratio to the liquid crystal dimming layer, wherein the ratio is a ratio of the light intensity on the mirror side to the light intensity on the back side, wherein the mirror side is a side of the first polarizer facing away from the liquid crystal dimming layer, and the back side is a side of the display component facing away from the transflective polarizer;

wherein the difference and the corresponding voltage satisfy one of the following relationships:
the difference smaller than a threshold corresponds to a first predetermined voltage value, and the difference greater than the threshold corresponds to a second predetermined voltage value, and the first predetermined voltage value and the second predetermined voltage value are different, and
different differences correspond to different voltages; and
the ratio and the corresponding voltage satisfy one of the following relationships:
the ratio smaller than a predetermined ratio corresponds to the first predetermined voltage value, and the ratio greater than the predetermined ratio corresponds to the second predetermined voltage value, and
different ratios correspond to different voltages; and
the liquid crystal dimming layer is configured to adjust a polarization direction of light passing through the liquid crystal dimming layer based on an applied voltage.

2. The rear-view mirror according to claim 1, wherein the liquid crystal layer is twisted nematic liquid crystal layer.

3. The rear-view mirror according to claim 1, wherein a light transmission axis of the first polarizer and a light transmission axis of the transflective polarizer satisfy one of the following relationships:
a parallel relationship; and
a perpendicular relationship.

4. The rear-view mirror according to claim 1, further comprising:
a first light sensor, wherein the first light sensor is disposed on the mirror side of the body and configured to detect the light intensity on the mirror side;
a second light sensor, wherein the second light sensor is disposed on the back side of the body and configured to detect the light intensity on the back side wherein the controller is electrically connected to the first light sensor and the second light sensor.

5. The rear-view mirror according to claim 1, wherein the body further comprises:
a first transparent reinforcement layer, wherein the first transparent reinforcement layer is laminated between the first polarizer and the liquid crystal dimming layer.

6. The rear-view mirror according to claim 5, wherein a surface of the first transparent reinforcement layer attached to the first polarizer is rough.

7. The rear-view mirror according to claim 1, wherein the body further comprises:
a second transparent reinforcement layer, wherein the second transparent reinforcement layer is laminated between the liquid crystal dimming layer and the transflective polarizer.

8. The rear-view mirror according to claim 1, wherein the body comprises: the first polarizer, a first substrate, a first transparent electrode layer, a liquid crystal layer, a second transparent electrode layer, a second substrate, the transflective polarizer, a color filter substrate, a liquid crystal pixel layer, an array substrate, a second polarizer, and a backlight which are sequentially laminated; and
the rear-view mirror further comprises a housing, a first light sensor, and a second light sensor, wherein the housing is configured to accommodate the body and is provided with a window corresponding to a mirror side of the body, the first light sensor is disposed on the mirror side of the body, the second light sensor is disposed on a back side of the body, the mirror side being a side of the first polarizer facing away from the first substrate, and the back side being a side of the backlight facing away from the transflective polarizer.

9. The rear-view mirror according to claim 8, wherein the body further comprises:
a third polarizer, wherein the third polarizer is laminated between the transflective polarizer and the color filter substrate, and a light transmission axis of the third polarizer is parallel to a light transmission axis of the transflective polarizer.

10. The rear-view mirror according to claim 9, wherein the first polarizer, the transflective polarizer, the second polarizer, and the third polarizer are linear polarizers.

11. The rear-view mirror according to claim 1, wherein the liquid crystal dimming layer comprises a first substrate, a first transparent electrode layer, a liquid crystal layer, a second transparent electrode layer, and a second substrate which are sequentially laminated;
wherein a side of the first substrate facing away from the first transparent electrode layer is attached to the first polarizer, and a side of the second substrate facing away from the second transparent electrode layer is attached to the transflective polarizer.

12. The rear-view mirror according to claim 11, wherein a connecting line between the controller and the first transparent electrode layer and a connecting line between the controller and the second transparent electrode layer are disposed on a same layer as the first transparent electrode layer.

13. The rear-view mirror according to claim 11, wherein the first transparent electrode layer comprises a first portion and a second portion which are insulated from each other;
wherein the first portion of the first transparent electrode layer is electrically connected to the second transparent electrode layer, and the second portion of the first transparent electrode layer is opposite to the second transparent electrode layer.

14. The rear-view mirror according to claim 13, wherein the second portion of the first transparent electrode layer is disposed in a middle of the first substrate, and the first portion of the first transparent electrode layer is disposed on an edge of the first substrate and surrounds the second portion of the first transparent electrode layer.

15. The rear-view mirror according to claim 14, wherein the first portion of the first transparent electrode layer is provided with a plurality of connection points to the second transparent electrode layer, and the plurality of connection points are distributed around the second portion of the first transparent electrode layer.

16. The rear-view mirror according to claim 1, further comprising:
an infrared sensor, wherein the infrared sensor is disposed on a side of the first polarizer facing away from the liquid crystal dimming layer.

17. An anti-glare display control method of a rear-view mirror, wherein the rear-view mirror comprises a body comprising a first polarizer, a liquid crystal dimming layer, a transflective polarizer, and a display component which are sequentially laminated, wherein the liquid crystal dimming layer is configured to adjust a polarization direction of light passing through the liquid crystal dimming layer based on an applied voltage; and the method comprises:

detecting a light intensity on a mirror side of the body and a light intensity on a back side of the body, wherein the mirror side is a side of the first polarizer facing away from the liquid crystal dimming layer, and the back side is a side of the display component facing away from the transflective polarizer;

applying a voltage corresponding to a difference to the liquid crystal dimming layer, wherein the difference is a difference between the light intensity on the mirror side and the light intensity on the back side, and/or applying a voltage corresponding to a ratio to the liquid crystal dimming layer, wherein the ratio is a ratio of the light intensity on the mirror side to the light intensity on the back side:

wherein the difference and the corresponding voltage satisfy one of the following relationships:

the difference smaller than a threshold corresponds to a first predetermined voltage value, and the difference greater than the threshold corresponds to a second predetermined voltage value, and the first predetermined voltage value and the second predetermined voltage value are different, and different differences correspond to different voltages; and the ratio and the corresponding voltage satisfy one of the following relationships:

the ratio smaller than a predetermined ratio corresponds to the first predetermined voltage value, and the ratio greater than the predetermined ratio corresponds to the second predetermined voltage value, and different ratios correspond to different voltages.

18. A non-transitory computer-readable storage medium storing a computer program therein, wherein the computer program, when run by a processor, causes the processor to perform the method according to claim 17.

19. A control device, comprising:

a memory storing at least one program instruction therein; and at least one processor communicably coupled to the memory;

wherein the at least one processor, when executing the at least one program instruction, is caused to perform an anti-glare display control method of the rear-view mirror, wherein the rear-view mirror comprises a body comprising a first polarizer, a liquid crystal dimming layer, a transflective polarizer, and a display component which are sequentially laminated, wherein the liquid crystal dimming layer is configured to adjust a polarization direction of light passing through the liquid crystal dimming layer based on an applied voltage; and the method comprises:

detecting a light intensity on a mirror side of the body and a light intensity on a back side of the body, wherein the mirror side is a side of the first polarizer facing away from the dimming layer, and the back side is a side of the display component facing away from the transflective polarizer;

applying a voltage corresponding to a difference to the liquid crystal dimming layer, wherein the difference is a difference between the light intensity on the mirror side and the light intensity on the back side, and/or applying a voltage corresponding to a ratio to the liquid crystal dimming layer, wherein the ratio is a ratio of the light intensity on the mirror side to the light intensity on the back side:

wherein the difference and the corresponding voltage satisfy one of the following relationships:

the difference smaller than a threshold corresponds to a first predetermined voltage value, and the difference greater than the threshold corresponds to a second predetermined voltage value, and the first predetermined voltage value and the second predetermined voltage value are different, and different differences correspond to different voltages; and the ratio and the corresponding voltage satisfy one of the following relationships:

the ratio smaller than a predetermined ratio corresponds to a first predetermined voltage value, and the ratio greater than the predetermined ratio corresponds to a second predetermined voltage value, and different ratios correspond to different voltages.

* * * * *